UNITED STATES PATENT OFFICE.

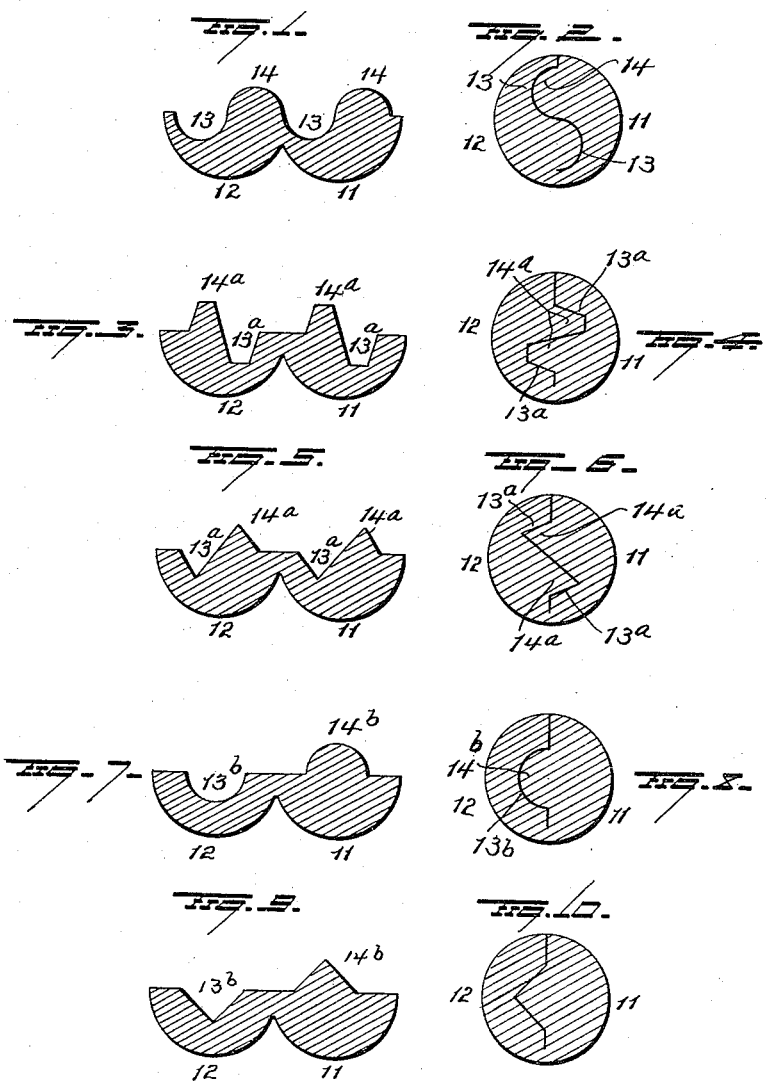

ETHAN I. DODDS, OF PITTSBURGH, PENNSYLVANIA, ASSIGNOR TO FLANNERY BOLT COMPANY, OF PITTSBURGH, PENNSYLVANIA.

METHOD OF MAKING BLANKS FOR FLEXIBLE BOLTS.

1,205,171.     Specification of Letters Patent.     Patented Nov. 21, 1916.

Application filed June 15, 1915. Serial No. 34,264.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Methods of Making Blanks for Flexible Bolts; and I do hereby declare the following to be a full, clear, and exact description of the invention, such as will enable others skilled in the art to which it appertains to make and use the same.

My invention relates to an improvement in method of making blanks for flexible bolts, the object being to simplify the process of manufacturing the bars from which the blanks are made, whereby the cost of production of the bolts will be reduced and the output increased.

The improvement is applicable to the manufacture of flexible stay bolts for boilers and also railway track bolts, and it consists in rolling a flat bar into two semi-cylindrical connected members one of which has a recess to receive a longitudinal rib on the inner or contacting face of the other member, when the bar is rolled into cylindrical shape, thus producing a bar composed of interlocked longitudinal members connected at one edge only.

In the accompanying drawings, Figure 1 is a view of a bar after its preliminary rolling; Fig. 2 is a view in section of said bar after it has been folded onto itself and rolled into cylindrical shape, and Figs. 3 to 10 inclusive are views of modified forms.

In carrying out my method I take a slab or bar of steel or iron and pass it while heated, between rolls shaped to convert the slab or bar into two semi-cylindrical connected members 11 and 12. each of which has a groove 13 and a rib 14 on its inner or contacting face, the said grooves and ribs being so located, that when the two members are folded together by rolling, the rib of each section rests within the groove of the other section as shown in Fig. 2. The cross section of this bar is circular with an S-shaped substantially closed slit formed by the ribs and grooves, the slit being closed at one edge. After the bar has been shaped as shown in Fig. 1, it is passed between rolls and rolled into cylindrical shape as in Fig. 2, without welding the two contacting faces, thus forming a cylindrical bar composed of two members united at one edge only. After the bar has been thus formed, it may be twisted longitudinally from end to end so that the exposed edge of the slit will be in the form of a spiral extending from one end of the bar to the other.

To make bolts from the bar, the latter is reheated and is fed to a machine which upsets the head and cuts off the blank. By twisting the bar from which the bolt blanks are cut, the twist will be constant and uniform from end to end and consequently uniform in the blanks that are cut from the bar. The upsetting of the heads welds the walls of the slit at the heads, but leaves the contacting walls of the slit in the shanks of the bolts disconnected, thus permitting the shanks to give or yield under longitudinally and torsional stresses. After the blanks have been cut from the bar, the threads are then either hot or cold rolled or they may be cut.

Figs. 3 and 5 represent bars or slabs after the preliminary rolling, each member 11 and 12 having a rib and a groove as in the previous construction, and Figs. 4 and 6 shows these forms after they have been folded and rolled into cylindrical shape.

In Figs. 1 and 2 the grooves and ribs have curved faces, whereas in Figs. 3 to 6 inclusive the grooves $13^a$ and ribs $14^a$ are angular.

In the construction shown in Figs. 7 and 8, one member 11 of the slab or bar is provided with a centrally located longitudinal rib $14^b$ and the other member 12 is provided with a similarly shaped groove $13^b$ to receive the rib when the two members are rolled into cylindrical shape as in Fig. 8.

The construction shown in Figs. 9 and 10 is the same as that shown in Figs. 7 and 8 except that the rib and groove are angular instead of curved.

The forms shown in Figs. 7 to 10 are particularly adapted for boiler stay bolts construction, as they leave the center of the bar solid and intact for the tell tale holes or bores which are always located centrally in the bolt head.

It is quite evident that the shapes of the grooves and ribs may be modified without departing from the spirit of the invention hence I would have it understood that I do not confine myself to the details of their features.

Having fully described my invention what I claim as new and desire to secure by Letters-Patent, is:—

1. The herein described method of making bars for bolt blanks consisting in rolling a bar or slab to form two connected members one having a longitudinal rib and the other a longitudinal groove, and the said rib and groove being so located that when the two members of the bar are closed onto each other the rib will rest in the groove, and rolling said connected members into cylindrical shape.

2. The herein described method of making bars for bolt blanks consisting in rolling a bar or slab to form two connected members each having a longitudinal rib and a longitudinal groove, the rib of each member being so located as to enter the groove of the other member when the bar is rolled in cylindrical shape, and rolling the bar into cylindrical shape without welding the contacting faces of the two members thereof.

In testimony whereof I have signed this specification in the presence of two subscribing witnesses.

ETHAN I. DODDS.

Witnesses:
F. H. ALLISON,
EDWIN S. RYCE.

Copies of this patent may be obtained for five cents each, by addressing the "Commissioner of Patents, Washington, D. C."